J. REGECZI.
ELECTRIC RAT TRAP.
APPLICATION FILED MAR. 22, 1912.
1,075,669.
Patented Oct. 14, 1913.
6 SHEETS—SHEET 1.
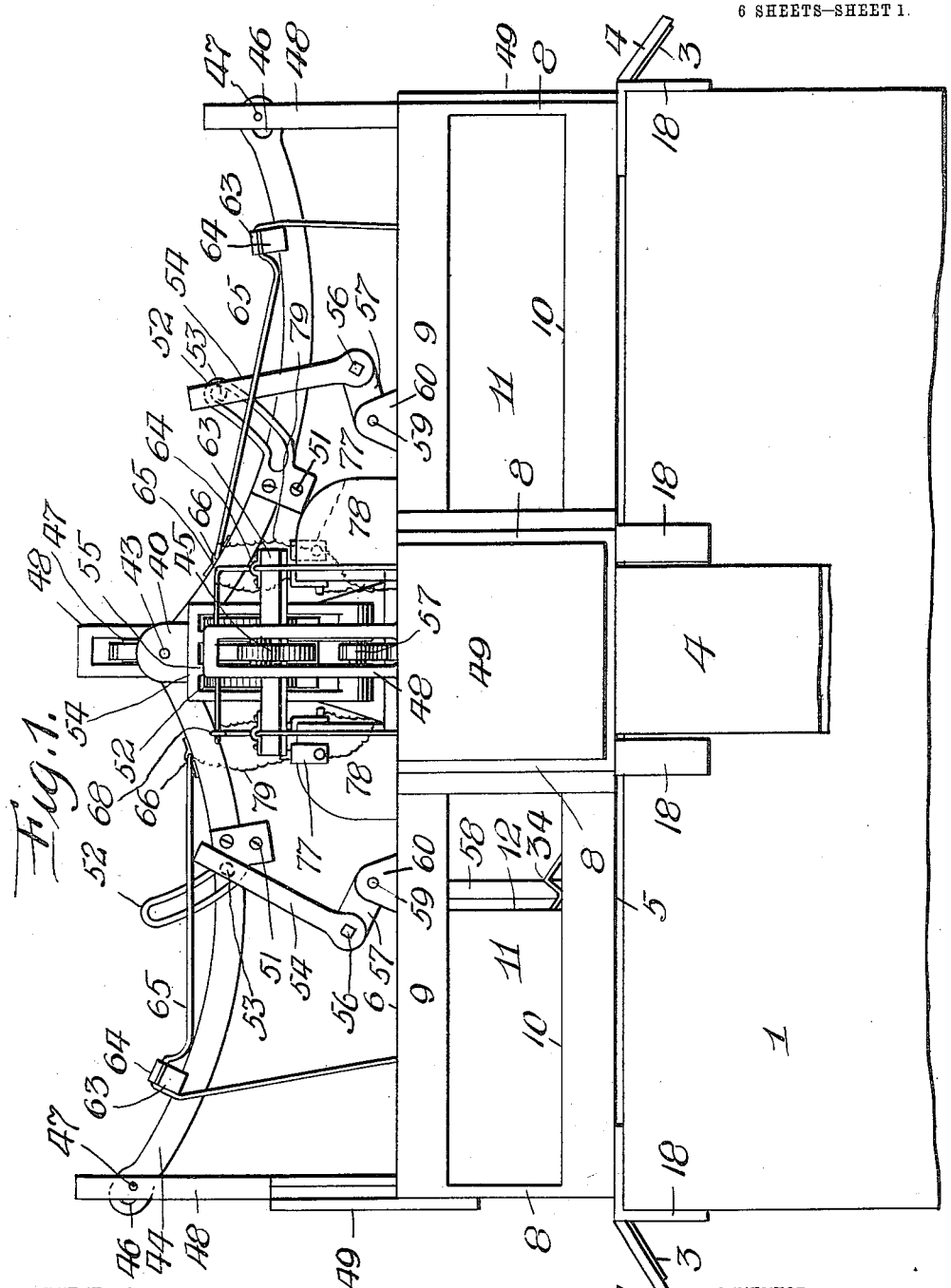
WITNESSES
Samuel Payne
INVENTOR
J. Regeczi.
BY
ATTORNEYS

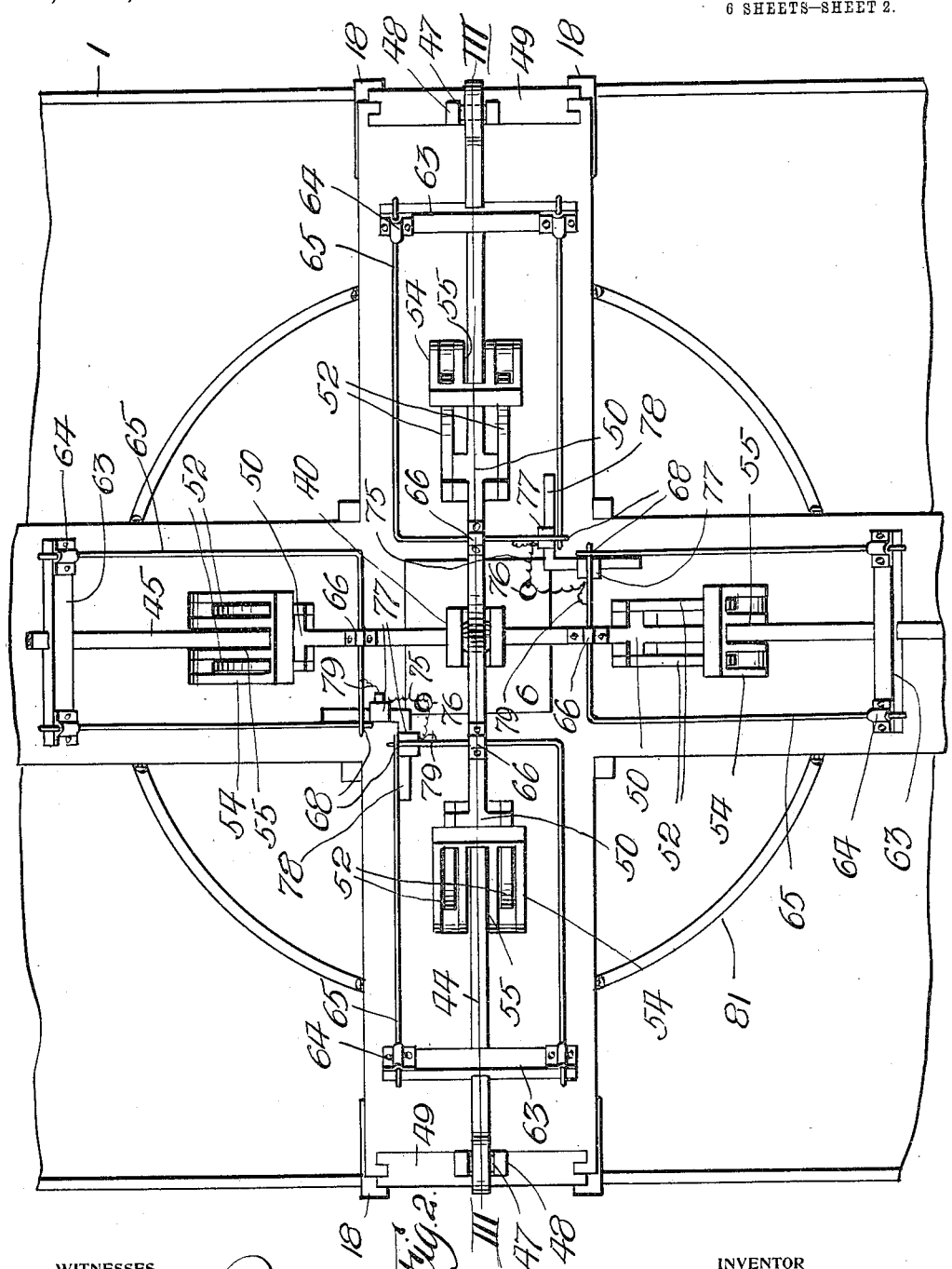

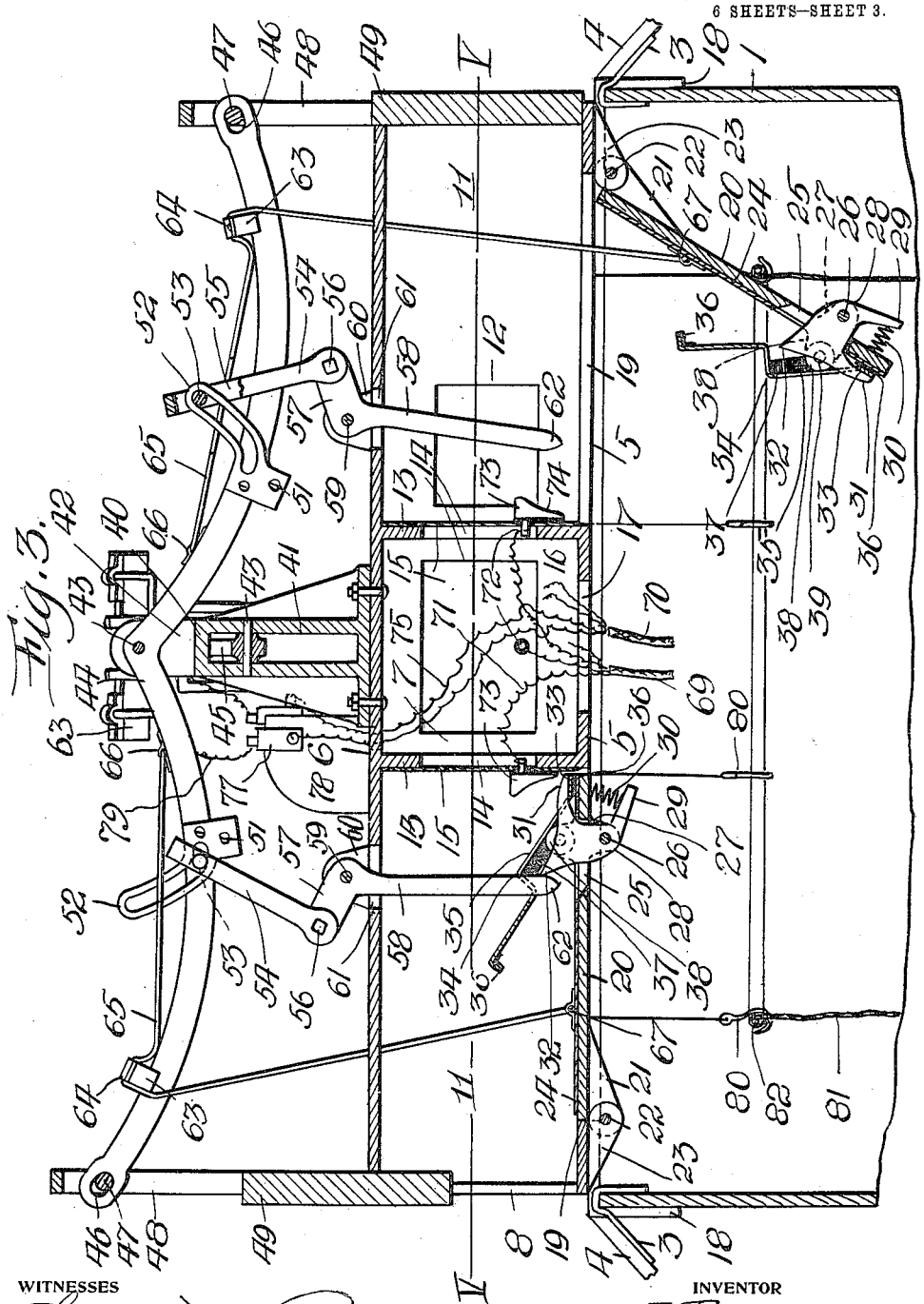

J. REGECZI.
ELECTRIC RAT TRAP.
APPLICATION FILED MAR. 22, 1912.
1,075,669.
Patented Oct. 14, 1913.
6 SHEETS—SHEET 4.
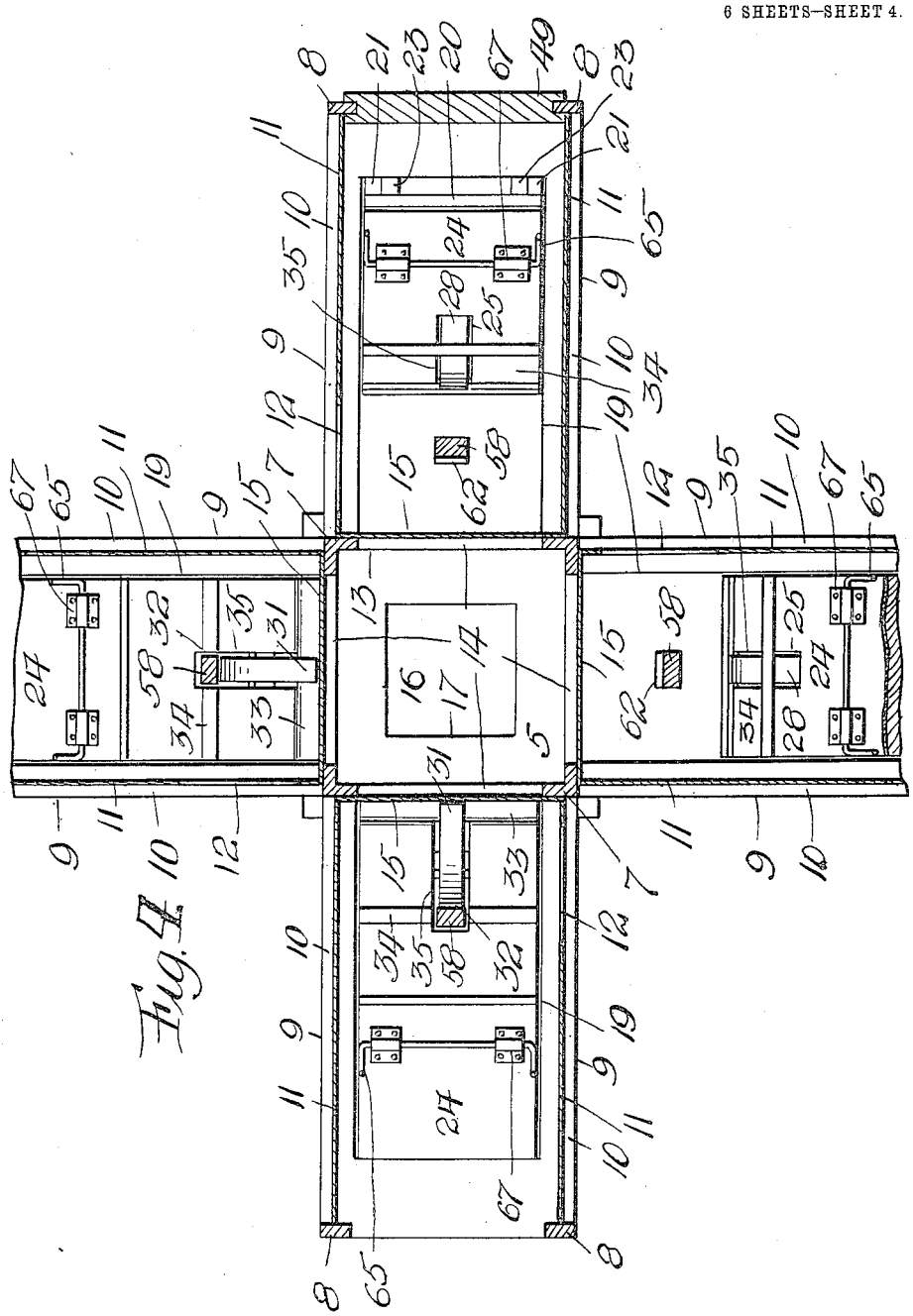
WITNESSES
INVENTOR
J. Regeczi.
BY
ATTORNEYS

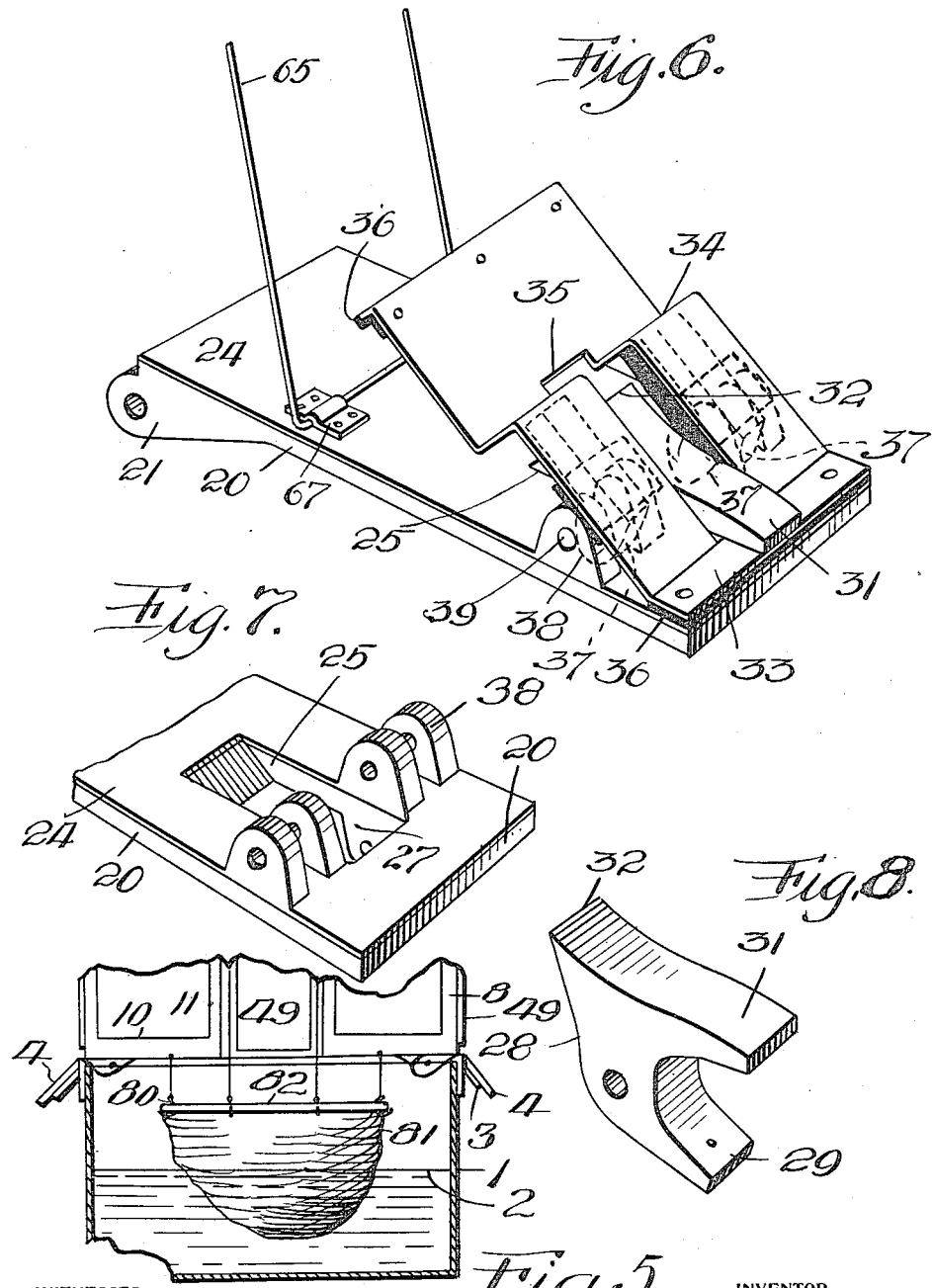

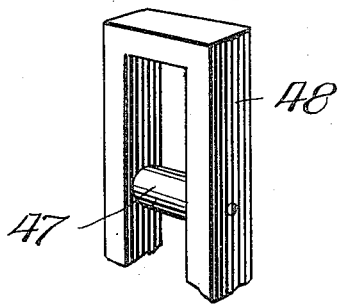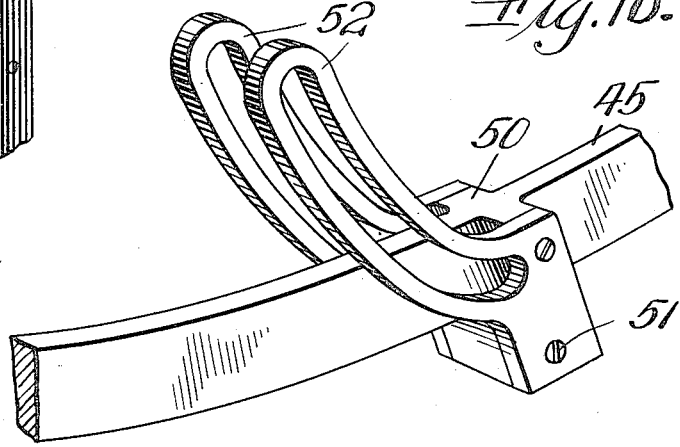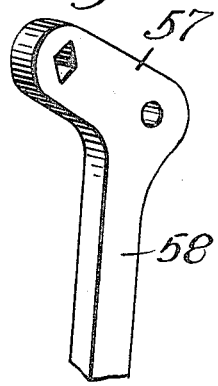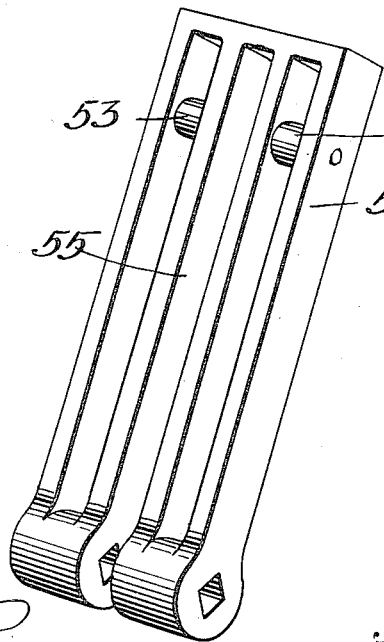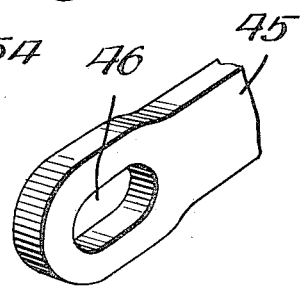

UNITED STATES PATENT OFFICE.

JOSEF REGECZI, OF GARY, INDIANA.

ELECTRIC RAT-TRAP.

1,075,669. Specification of Letters Patent. Patented Oct. 14, 1913.

Application filed March 22, 1912. Serial No. 635,599.

*To all whom it may concern:*

Be it known that I, JOSEF REGECZI, a subject of the King of Hungary, residing at Gary, in the county of Lake and State of Indiana, have invented certain new and useful Improvements in Electric Rat-Traps, of which the following is a specification, reference being had therein to the accompanying drawing.

This invention relates to an electric rat trap, and the invention aims to provide a trap into which a rat or other rodent is enticed and which has provision for exterminating the life of a rat or rodent by utilizing a current of electricity of sufficient voltage. The rat or rodent having been shocked or electrocuted is deposited into a body of water and if life is not extinct the water accomplishes the desired result.

The invention further aims to provide a trap having a series of trap doors and tiltable platforms that are arranged whereby the operation of one set of trap doors and tiltable platforms will reset another set of trap doors and platforms and in consequence of this arrangement the trap is always in condition for entrapping rats or rodents.

The invention still further aims to accomplish the above results by a combination of mechanical elements that are assembled to provide a durable structure that can be safely used, and the function and operation of these elements will be hereinafter specifically described and then claimed.

Reference will now be had to the drawings wherein like numerals of reference denote corresponding parts throughout the several views, in which:—

Figure 1 is a side elevation of a trap in accordance with this invention, Fig. 2 is a plan of the same, Fig. 3 is a longitudinal sectional view taken on the line III—III of Fig. 2, Fig. 4 is a horizontal sectional view taken on the line V—V of Fig. 3, Fig. 5 is a detail illustrating the bag suspended in the tank, Fig. 6 is an enlarged perspective view of a detached tiltable platform, Fig. 7 is a perspective view of a portion of the platform showing the bearings for a contact plate, Fig. 8 is an enlarged perspective view of a detached keeper, Fig. 9 is an enlarged perspective view of a trap door yoke, Fig. 10 is an enlarged perspective view of a cam member, Fig. 11 is a perspective view of a portion of a latch, Fig. 12 is an enlarged perspective view of a stirrup, and Fig. 13 is an enlarged perspective view of one end of a fulcrumed lever.

The reference numeral 1 denotes a tank or receptacle, preferably rectangular in plan and containing a liquid 2, as water. Arranged upon the upper edges of the tank 1, intermediate the vertical edges of the walls of said tank, are clips 3 supporting the upper ends of the gang planks 4 that facilitate a rat or rodent reaching the upper edges of the tank.

Supported by the upper edges of the tank 1 is a trap structure that is Maltese cross shaped in plan, said structure having radiating or diverging branches. The structure comprises a bottom plate 5, and a top plate 6 connected to said bottom plate by vertical angle posts 7 located centrally of the plates 5 and 6, and by posts 8 located at the ends of the plates 5 and 6. The posts 7 are connected to the posts 8 by side walls 9 having oblong openings 10 and the inner sides of these walls are lined with sheets of tin 11 having openings 12 at one side of the inner ends thereof to facilitate placing a suitable bait within the trap. The posts 7 are connected by vertical walls 13 having openings 14 and said walls are lined with metallic plates 15 arranged upon the outer sides of said walls. The top and bottom plates together with the walls 13 providing a central rectangular compartment 16 and the bottom plate 5 has an opening 17 establishing communication between the compartment 16 and the tank 1.

The trap structure has the bottom, at the ends thereof, provided with angle brackets 18 supporting said structure upon the upper edges of the tank 1 and said bottom plate is provided with oblong openings 19 to accommodate tiltable platforms 20. The platforms are provided with apertured ears 21 that are pivotally connected by a transverse pin 22 to apertured lugs 23 carried by the bottom plate 5. The tiltable platforms are pivotally connected to the outer ends of the bottom plate 5 and swing downwardly into the tank or receptacle 1. Each tiltable platform has a metallic contact plate 24 and said platform and said plate, adjacent to the free end thereof has an opening 25. Movably supported in the opening 25 by a transverse pin 26 connecting depending lugs 27 carried by the platform 20, is a keeper 28. The keeper 28 has the lower end thereof provided with an extension 29 connected by a coiled compression spring 30 to the bottom of the platform 20. The upper end of the keeper 28 has extensions 31 and 32. The extension 31 engages the inner end of a contact plate 33, said plate having a stepped portion 34 and a longitudinal slot 35, said slot providing clearance for the keeper 28. The ends of the contact plate are provided with strips of insulation 36. The contact plate 33 is provided with depending apertured ears 37, separated from the plate 33 by sheet insulation, that are pivotally mounted in sets of apertured ears 38 by pivot pins 39, said apertured ears being carried by the tiltable platform at the sides of the opening 25.

The top plate 6 centrally of the trap is provided with a bearing post 40 having slots 41 and 42. Pivotally mounted in these slots by pins 43 are rock levers 44 and 45 arranged at right angles to each other and extending over the diverging and radiating branches of the trap. The arrangement of the slots 41 and 42 permits of the rock lever 44 being positioned above the rock lever 45, and as these rock levers are identical in construction and operation I deem it only necessary to describe one of said levers in connection with two branches of the trap.

Each rock lever has the outer end thereof slotted, as at 46 to receive a roller 47 revolubly mounted in a vertical yoke 48 carried by the upper edge of the door 49. The doors 49 when lowered by the rock levers 45 and 45 close the outer ends of the radiating branch compartments. The lever, adjacent to the pivot thereof, has side enlargements 50 to which are secured, as at 51 parallel slotted cam members 52, said members accommodating revoluble rollers 53 carried by the outer ends of stirrups 54 that are slotted, as at 55 to provide clearance for the rock lever. The stirrups 54 are fixed by rectangular pins 56 to the angular ends 57 of latches 58. The latches 58 are pivotally mounted by pins 59 between apertured ears 60, carried by the top plate 6 and having the inner ends thereof pointed or tapered, as at 62. The pointed or tapered ends of the latches extending into the slots 35 of the contact plates 33 and are held in engagement with the contact plates 33 by the extensions 32 of the keepers 28. With the latches in this position the contact plates 33 are tilted, as best shown in Fig. 3.

The rock levers 44 and 45, adjacent to the ends thereof, are provided with cross heads 63 having the ends thereof provided with guides 64 for flexible rods 65. The rods 65 are attached to the rock levers 44 and 45, as at 66 and to the tiltable platform, as at 67. Each rod has a rectangular formation with the ends of each rod connected together, as at 68 and with the rods movably connected to the tiltable platforms, said platforms can be raised by a rocking movement of the lever 45.

Extending over the upper edges of the tank or through a suitable opening provided therefor in the wall of said tank are leading in cables 69 and 70 that are suitably insulated and that are connected to a suitable source of electrical energy, as a generator capable of producing a current of sufficient voltage to electrocute a rodent. Within the cables 69 are wires 71 that extend upwardly through the opening 17 of the bottom plate 5 and are connected to binding posts 72, electrodes 73 carried by the metallic lining 15 of the compartment 16. These electrodes have surfaces 74 adapted to be wiped by the extensions 31 of the keepers 28. The cable 70 contains wires 75 that extend upwardly through the opening 17, compartment 16 and openings 76 in the top plate 6, said wires being connected to angle plates 77 carried by angle supports 78 mounted upon the top plate 6. The angle plates 77 are connected by wires 79 to the rods 65, as best shown in Figs. 1, 2 and 4.

From the bottom plate 5 are suspended hooks 80 supporting the upper edges of a bag 81 that is suspended within the water or liquid contents within the tank. The upper edges of the bag 81 are maintained in a circular form by a ring 82 that is engaged by the hooks 80 inserted in the upper edges of the bag. The bag 81 is adapted to receive electrocuted rodents and said bag can be easily removed whereby the water will drain from the bag and permits of the bodies of the rodents being obtained and disposed of without renewing the contents of the tank 1.

Operation: A suitable bait can be placed upon the tiltable contact plates 33 to attract a rodent into one of the open branch compartments of the trap, it being impossible for the rodent to enter one of the openings of the side walls of the trap on account of the intervening body of water. A rodent attempting to obtain the bait places the fore feet upon the elevated edge of the tiltable contact plate and rocks said plate sufficiently to release the latch 58 and move the edge of the tiltable contact plate into engagement with the electrodes 73. An electric circuit is then completed which is as follows: the branch wire 71 of the cable 69 to the electrodes 73, tiltable contact plate through the rodent's body to the metallic plate 24 of the tiltable platform 20, rods 65 to rock lever 45, rods 65 by wire 79 to the binding posts of the angle supports 78 and by wire 75 to the cable 70. The weight of a rat upon a platform 20, when this has been released, causes it to drop whereupon the rock lever will be tilted by the connection 65. When the platform 20 is lowered the rat is deposited within the liquid in the bag 81.

From the foregoing it will be observed that the trap always has two branch compartments open and ready for use, and that the other compartments are open or set for use upon the first mentioned compartments being closed or used. Further, each branch compartment of the trap has contact plates normally in an open circuit and the circuit is only completed by a rodent's body, which cannot escape from the compartment on account of the door closing, even though not thoroughly electrocuted. With the operating mechanism of the trap properly balanced, the mechanism can be actuated by a mere pressure of the fore feet of a rodent, the mechanism being very sensitive in order that even a mouse can operate the trap.

I reserve the right to use suitable insulation to prevent a short circuit and to resort to any suitable source of electrical energy that is capable of electrocuting a rodent.

What I claim is:—

1. In a rat trap, the combination with a suitable source of electrical energy, a tank containing water, and gang planks leading to the upper edges of said tank, of a trap structure supported by the upper edges of said tank and having branch compartments, rock levers pivotally mounted upon the top of said structure, doors carried by the ends of said rock levers and adapted to alternately close two branch compartments of said trap structure, a releasable tiltable platform arranged in each branch compartment of said trap structure and adapted to be lowered by the weight of a rodent to deposit the rodent into said tank, means for releasing said tilting platforms and contact plates in each compartment of said trap and normally in an open circuit with said source of electrical energy.

2. In a rat trap, the combination with a receptacle containing water, of a trap structure supported by the upper edges of said receptacle and having radiating branch compartments formed therein, rock levers pivotally mounted upon the top of said trap structure, doors carried by the ends of said rock levers and adapted to alternately close opposite branch compartments of said trap, releasable tiltable platforms arranged in the compartments of said trap, releasing means for said tiltable platforms, and connections between said tiltable platforms and said rock levers whereby said tiltable platforms when released will be lowered by the weight of a rodent simultaneously with the closing of said door and will precipitate the rodent into said tank.

In testimony whereof I affix my signature in the presence of two witnesses.

JOSEF REGECZI.

Witnesses:
 ARTHUR BUCHKO,
 JOF. KAROLYI.